Feb. 25, 1958     H. B. CRAIG     2,824,469
CHAIN SAW SERVICING VICE
Filed May 7, 1956
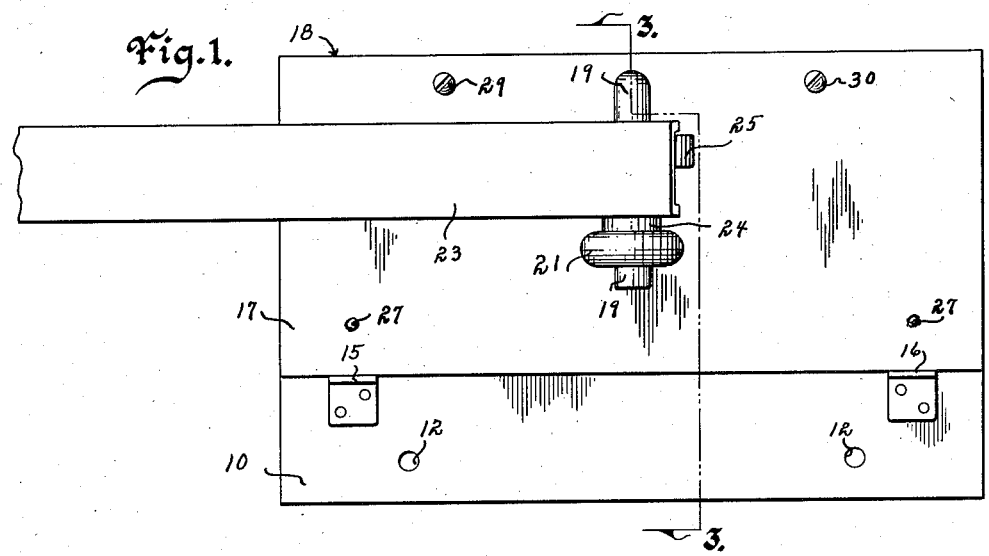
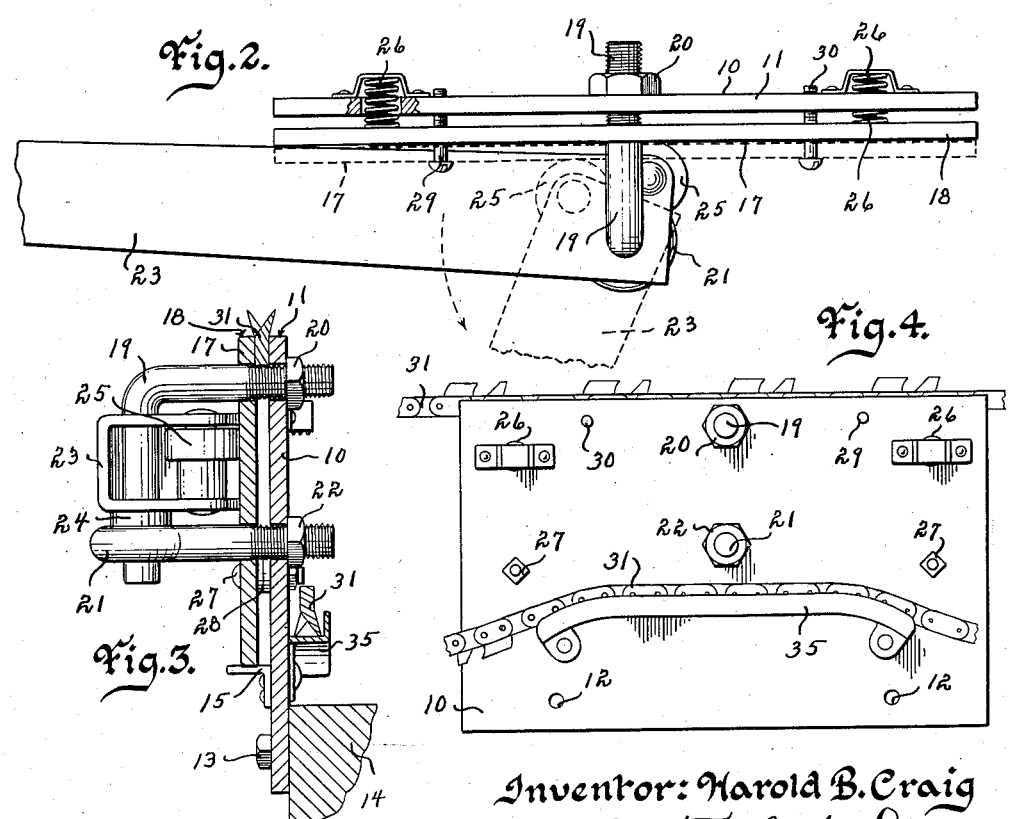
Inventor: Harold B. Craig
by M. Talbert Dick
Attorney
Witness
Edward P. Seeley United States Patent Office 2,824,469
Patented Feb. 25, 1958

2,824,469
CHAIN SAW SERVICING VICE
Harold B. Craig, Keosauqua, Iowa
Application May 7, 1956, Serial No. 582,979
4 Claims. (Cl. 76—78)

This invention relates to a quick acting vice and more particularly to a vice for successfully holding chain saws during servicing.

Chain saws are notoriously hard to repair or sharpen. One reason for this is their flexible character. Also a chain saw is cumbersome to handle and the average shop vice is not adaptable for properly holding the chain during its treatment. Furthermore, with the usual vice, the teeth of the return portion of the chain often are damaged by improper contact with the vice. Still another problem in chain saw servicing is a necessary straight line for guidance.

Therefore, one of the principal objects of my invention is to provide a vice means that will successfully support and properly hold a chain saw during servicing.

A further object of this invention is to provide a chain saw vice that is rapid in operation.

A still further object of my invention is to provide a chain saw holding vice that has a plate support for accurate top alignment.

A still further object of my invention is to provide a chain saw vice that may be easily and quickly adjusted.

A still further object of this invention is to provide a chain saw vice means that will not damage other sections of the saw not being held in clamped condition.

Still further objects of this invention are to provide a vice for chain saws that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a front view of my device ready for use,
Fig. 2 is a top plan view of my chain saw vice,
Fig. 3 is an enlarged vertical sectional view of the vice taken on line 3—3 of Fig. 1, and
Fig. 4 is a back view of the device and more fully illustrates its construction.

In these drawings I have used the numeral 10 to designate the vertical base plate having a straight horizontal top edge 11 as shown in Fig. 1. This plate has holes 12 for receiving stud bolts 13 or like for fastening the unit to a support 14 such as a work bench. On the front lower side of the plate I have secured two spaced apart horizontal shelves 15 and 16. The tops of these shelves form a true horizontal plane for aligning and supporting the second plate portion 17. This plate 17 has its top horizontal edge 18 parallel and adjacent the edge 11 of the base plate 10. These two plates, i. e., 10 and 17, form the two jaw members of my vice. The numeral 19 designates an L-bolt loosely extending through the plate jaws 10 and 17 near the tops and with its nut 20 on the back side of the device as shown in Fig. 3. The numeral 21 designates an eye bolt also loosely extending through the jaw plates, in a spaced vertical plane directly below the L-bolt and with its nut 22 on the back side of the unit. The free end of the L-bolt 19 extends downwardly through the eye of the bolt 21, as shown in Fig. 3. The numeral 23 designates a lever horizontally U-shaped in cross section, with its open side toward the plate 17, and with its rear end portion hinged on the L-bolt 19, by the downwardly extending portion of the bolt loosely extending vertically through it. A spacing washer 24 on the L-bolt and between the eye of the bolt 21 and the bottom of the lever 23, supports the lever above the eye bolt, as shown in Fig. 1. The numeral 25 designates a cam wheel roller rotatably secured on the fixed end of the lever and back of the downwardly extending portion of the L-bolt, as shown in Fig. 3.

Extending through holes in the base plate are retained coil springs 26 bearing on the inner side of the plate 17 and yielding holding the plate away from the plate 10, as shown in Fig. 2. The bottom area of the plate 17 and plate 10 are adjustably held in spaced relationship by extending bolt means 27 through the plates and which carry washers 28 between the plates, as shown in Fig. 3. Numerals 29 and 30 designate two support pins extending through the upper portions of the two jaw plates and which are at each side of the L-bolt 19, respectively. The upper surface of these pins 29 and 30 are in a common horizontal plane with the top of the L-bolt and are adapted to support a length of chain saw 31, as shown in Fig. 4. The numeral 35 designates a chain tray of suitable soft material such as copper on the rear side of the plate 10, as shown in Fig. 4.

The practical operation of the device is as follows:

The lever 23 is pulled to the rear as shown by broken lines in Fig. 2. This action brings the cam roller away from the front of the plate 17. The coil springs will then yieldingly force the two jaw plates away from each other. The portion of the chain saw to be serviced is then laid between the two plate jaws 10 and 17 and onto the supporting horizontal shafts of the L-bolt 19 and two pins 29 and 30. The other portion of the chain saw is placed across the tray 35 where its teeth are protected from damage. Then merely by swinging the left end of the lever toward the plate 17, the cam roller will depress the plate 17 toward the plate 10 thereby successfully clamping the chain section between the two plate jaws. To release the chain saw it is merely necessary to swing the lever rearwardly. Thus the entire chain saw length may be easily and quickly serviced. The roller 25 is so positioned that when the lever is pushed completely forwardly the roller will pass slightly beyond dead center and the lever will thereby stay in closed position. For different widths of chain saws the nuts 20 and 22 are adjusted.

While I have described my vice for holding chain saws, obviously it may be used as a vice for holding other objects.

Some changes may be made in the construction and arrangement of my chain saw servicing vice without departing from the real spirit and purpose of my invention, and it is my intention to cover by my claims, any modified forms of structure or use of mechanical equivalents which may be reasonably included within their scope.

I claim:

1. In a vice, a vertical base jaw plate, a second vertical base jaw plate adjacent said first jaw plate, spring means for yieldingly holding said two jaw plates away from each other, a lever bracket means secured to said first jaw plate and loosely extending through said second plate jaw, a cam lever hinged to said bracket means and engageable with the outer side of said second plate jaw, and a saw chain tray support on one side of said first plate jaw; said tray being in the form of an open ended trough having its two end portions extending downwardly and outwardly.

2. In a vice, a vertical base jaw plate, a second vertical base jaw plate adjacent said first jaw plate, spring means for yieldingly holding said two jaw plates away from each other, a lever bracket means secured to said first jaw plate and loosely extending through said second plate jaw, a cam lever hinged to said bracket means and engageable with the outer side of said second plate jaw, and a saw chain tray support of soft material on one side of said first plate jaw; said tray being in the form of an open ended trough having its two end portions extending downwardly and outwardly.

3. In a vice, a vertical base jaw plate, a second vertical base jaw plate adjacent said first jaw plate, spring means for yieldingly holding said two jaw plates away from each other, an eye bolt loosely extending through said first and second plate jaws with its eye adjacent the outer side of said second jaw, an L-bolt loosely extending through said first and second plate jaws with its free end extending through the eye of said eye bolt, a lever hinged to that part of said L-bolt that extends through the eye of said eye bolt, a roller wheel on said lever engageable with the outer side of said second plate jaw, and a support pin means extending through said first and second plate jaws at each side of said L-bolt and in the same plane as said L-bolt.

4. In a vice, a vertical base jaw plate, a second vertical base jaw plate adjacent said first jaw plate, spring means for yieldingly holding said two jaw plates away from each other, a lever bracket means secured to said first jaw plate and loosely extending through said second plate jaw, a mechanical means for bringing said two plate jaws toward each other, and a saw chain tray support on one side of said first plate jaw; said tray being in the form of an open ended trough having its two end portions extending downwardly and outwardly.

References Cited in the file of this patent

UNITED STATES PATENTS

| Number | Name | Date |
|---|---|---|
| 792,998 | Loken | June 20, 1905 |
| 858,503 | Douglas | July 2, 1907 |
| 1,028,775 | Peterson | June 4, 1912 |
| 1,069,745 | Wagner | Aug. 12, 1913 |
| 1,084,824 | Shaules et al. | Jan. 20, 1914 |
| 1,812,452 | Shaw | June 30, 1931 |
| 2,258,969 | Brown | Oct. 14, 1941 |
| 2,415,137 | Johnson | Feb. 4, 1947 |
| 2,459,233 | Mall | Jan. 18, 1949 |
| 2,589,165 | Toy et al. | Mar. 11, 1952 |